(12) United States Patent
Hassani et al.

(10) Patent No.: US 12,703,261 B2
(45) Date of Patent: Aug. 11, 2026

(54) SYSTEMS AND METHODS TO DIAGNOSE CHARGING CONNECTION INTERFACES

(71) Applicant: Ford Global Technologies, LLC, Dearborn, MI (US)

(72) Inventors: Ali Hassani, Ann Arbor, MI (US); Alexandra Taylor, Harbor Springs, MI (US); John Robert Van Wiemeersch, Novi, MI (US)

(*) Notice: Subject to any disclaimer, the term of this patent is extended or adjusted under 35 U.S.C. 154(b) by 475 days.

(21) Appl. No.: 18/186,648

(22) Filed: Mar. 20, 2023

(65) Prior Publication Data

US 2024/0317095 A1 Sep. 26, 2024

(51) Int. Cl.

| | |
|---|---|
| ***B60L 53/62*** | (2019.01) |
| ***B60L 53/16*** | (2019.01) |
| ***H02J 3/32*** | (2026.01) |
| ***H02J 7/00*** | (2026.01) |
| ***H02J 7/42*** | (2026.01) |

(52) U.S. Cl.

CPC ............... *B60L 53/62* (2019.02); *B60L 53/16* (2019.02); *H02J 3/322* (2020.01); *H02J 7/42* (2026.01); *B60L 2250/00* (2013.01)

(58) Field of Classification Search

CPC ...... B60L 53/62; B60L 53/16; B60L 2250/00; B60L 53/66; H02J 3/322; H02J 7/00034; H02J 7/42; G01R 31/68; G01R 19/00

See application file for complete search history.

(56) References Cited

U.S. PATENT DOCUMENTS

| | | | | |
|---|---|---|---|---|
| 9,685,800 | B2 | 6/2017 | Hatakeyama et al. | |
| 10,046,661 | B2 | 8/2018 | DeDona et al. | |
| 11,258,112 | B2 | 2/2022 | Austin | |
| 2015/0097525 | A1* | 4/2015 | DeDona .................. | B60L 1/006 320/109 |

(Continued)

FOREIGN PATENT DOCUMENTS

| | | | |
|---|---|---|---|
| DE | 102010054464 | A1 | 6/2011 |
| WO | 2012078921 | A2 | 6/2012 |

OTHER PUBLICATIONS

Zuchang Gao, et al., Design and Implementation of a Smart Lithium-Ion Battery System with Real-Time Fault Diagnosis Capability for Electric Vehicles, Energies 2017, 10, 1503, Sep. 27, 2017, 1-15.

*Primary Examiner* — Nga X Nguyen

(74) *Attorney, Agent, or Firm* — Emily Campbell; Eversheds Sutherland (US) LLP

(57) ABSTRACT

A vehicle including a plurality of vehicle charger pins that may be configured to connect with a charging connector is disclosed. The vehicle may further include a transceiver and a processor. The transceiver may be configured to receive real-time information associated with each vehicle charger pin when the vehicle may be charged using the charging connector. The processor may be configured to obtain the real-time information from the transceiver, and determine whether the charging connector may be improperly connected or a connection interface may be faulty based on the real-time information. Responsive to a determination that the connection interface may be faulty, the processor may be configured to perform a self-diagnostic test to determine whether a vehicle charger pin may be faulty or the charging connector may be faulty, and perform a predetermined action based on the self-diagnostic test.

11 Claims, 5 Drawing Sheets

(56) References Cited

U.S. PATENT DOCUMENTS

2020/0395638 A1* 12/2020 Austin .................... B60L 53/38
2022/0367891 A1* 11/2022 Park ..................... B67D 7/0401
2023/0120740 A1* 4/2023 Lewchuk .......... H02J 13/00002
320/109

* cited by examiner

SYSTEMS AND METHODS TO DIAGNOSE CHARGING CONNECTION INTERFACES

FIELD

The present disclosure relates to electric vehicles, and more particularly, to a system and method for diagnosing faults in charging connectors and/or vehicle charger pins.

BACKGROUND

As awareness of green technology is increasing, battery electric vehicles (BEVs) and plug-in hybrid electric vehicles are gaining popularity. An Electric Vehicle (EV) operates on electric energy, and a vehicle user is required to charge the vehicle battery using EV chargers.

While planning a trip, the vehicle user may search for EV chargers along the trip route and plan EV charging based on locations, tiers, etc. of chargers along the route. Conventional systems are available that provide charger information (e.g., location, tier, etc.) to the user, which may assist the user in planning the trip and identifying chargers to charge the EV. However, there may be instances where the chargers identified by the user may not be in working condition. Such instances may cause inconvenience to the user and may disrupt the user trip.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
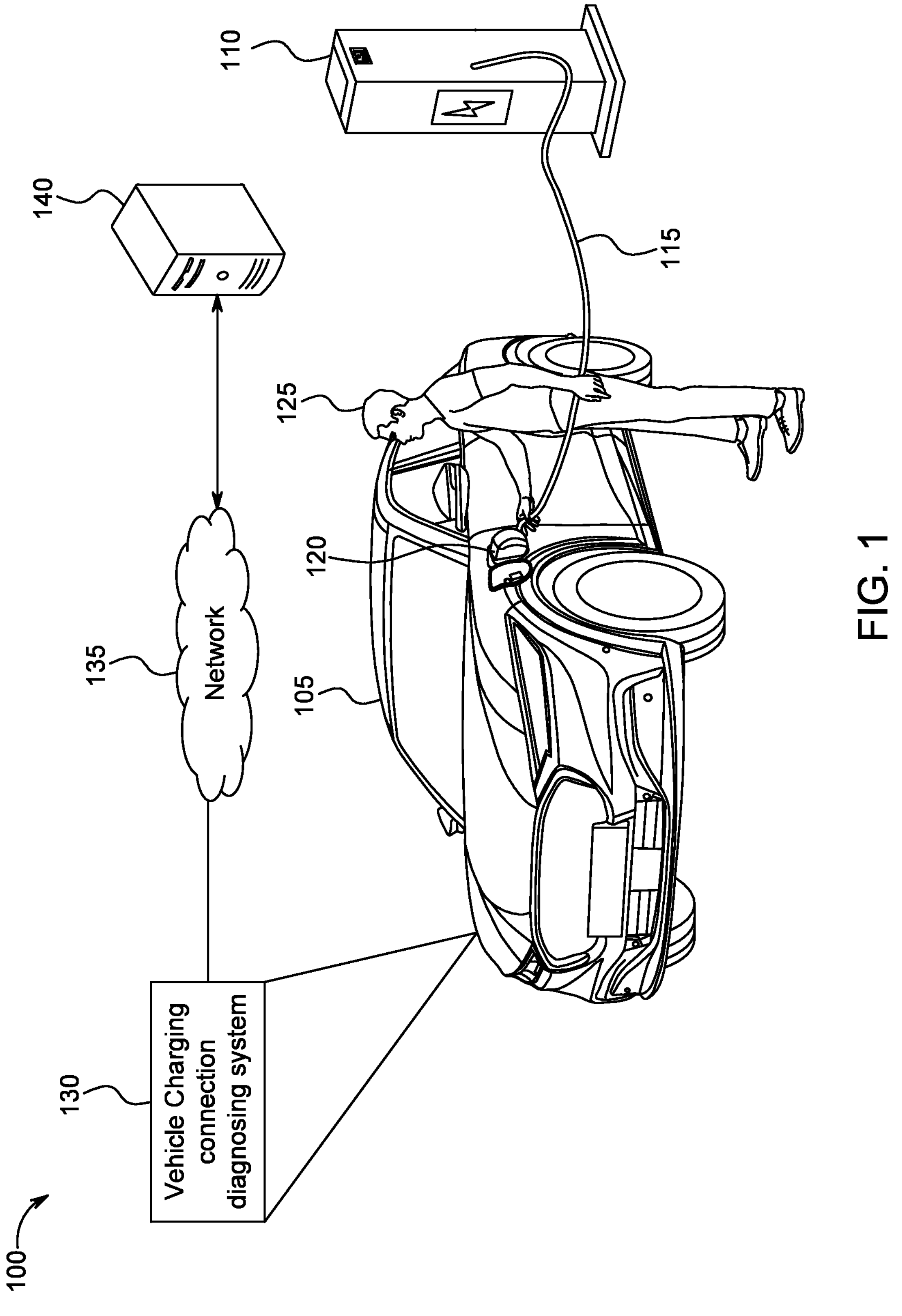
FIG. 1 depicts an example environment in which techniques and structures for providing the systems and methods disclosed herein may be implemented.

The present disclosure describes a system and method for diagnosing and reporting faulty charging connectors associated with a charging station and/or a faulty vehicle connector. The vehicle connector may include a plurality of vehicle charger pins, and the system that may obtain real-time information associated with each vehicle charger pin. Responsive to obtaining the real-time information, the system may determine whether the charging connector may be improperly connected to the vehicle connector or if the connection interface (e.g., the charging connector or the vehicle connector) may be faulty. For example, the system may obtain current drawn by each vehicle charger pin when the charging connector may be connected to the vehicle connector. The system may then determine whether current drawn by one or more vehicle charger pins is less than a first threshold or if the current drawn by all vehicle charger pins is less than the first threshold. The system may determine that the charging connector may be improperly connected when the current drawn by all the vehicle charger pins may be less than the first threshold. On the other hand, the system may determine that the connection interface may be faulty when the current drawn by a vehicle charger pin may be less than the first threshold, and current drawn by another vehicle charger pin may be equivalent to the first threshold.

In some aspects, the system may perform a self-diagnostic test based on a determination that the connection interface may be faulty. Specifically, the system may determine a fault location, e.g., whether the charging connector may be faulty or the vehicle connector may be faulty based on the self-diagnostic test. In some aspects, to perform the self-diagnostic test, the system may transmit a first potential to each vehicle charger pin and obtain a second potential output by each vehicle charger pin responsive to transmitting the first potential. The system may determine a difference between the first potential and the second potential and may determine the fault location based on the difference. For example, the system may determine that the vehicle connector may be faulty when the difference may be greater than a second threshold. On the other hand, the system may determine that the charging connector may be faulty when the difference may be less than the second threshold.

In further aspects, the system may obtain historical fault information associated with the vehicle connector and/or the charging connector and may verify the determined fault location based on the historical fault information. For example, the system may determine that the charging connector may be faulty when the system determines that other vehicles connected to the system too have historically reported fault with the charging connector.

In further aspects, the system may be configured to transmit notifications to a user device, a vehicle Human-Machine Interface (HMI), and/or a server associated with the charging station based on the diagnosis. For example, the system may transmit a notification to the user device when the charging connector may be improperly connected to the vehicle connector or when the system determines that the vehicle connector may be faulty. In addition, the system may transmit a notification to the server when the system determines that the charging connector may be faulty.

The present disclosure discloses a system that may accurately determine faulty charging connector and transmit information associated with the faulty charging connector to the server such that other users may be aware of the working (or non-working) condition of the charging connector. The other users may use such information and plan their vehicle charging accordingly. In addition, the system may identify if the vehicle connector may be faulty and accordingly notify the user so that the user may take appropriate action and get the vehicle serviced.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 105 that may be a battery electric vehicle (BEV). The vehicle 105 may take the form of any passenger or commercial vehicle such as, for example, an off-road vehicle, a car, a crossover vehicle, a van, a minivan, a bus, a truck, etc. Further, the vehicle 105 may be a manually driven vehicle and/or may be configured to operate in partially or fully autonomous mode. In further aspects, the vehicle 105 may be a plug-in hybrid electric vehicle (PHEV). When the vehicle 105 is PHEV, the vehicle 105 may be equipped with an internal combustion engine that can be employed either alone or in combination with other energy sources to propel the vehicle 105.

The vehicle 105 may include a traction battery or battery pack (not shown) that may provide energy for vehicle propulsion. The battery may be charged by an external power source 110. The external power source 110 may be a charging point (hereinafter referred to as a charging station 110). The charging station 110 may include a connecting device 115 that may connect the charging station 110 and the vehicle 105. The connecting device 115 may include a cable and a charging connector 120 that may be inserted in the vehicle 105 for charging. In further aspects, the charging connector 120 may be associated with an off-board system (e.g., grid, home appliances, charging stations, or other vehicles). Stated another way, the charging station 110 may be another vehicle configured to transfer power to the vehicle 105. In particular, when a vehicle user 125 desires to charge the vehicle 105, the user 125 may insert the charging connector 120 into a vehicle connector (shown as vehicle connector 305 in FIG. 3) located in the vehicle 105. The vehicle connector may include a plurality of vehicle charger pins (shown as vehicle charger pins 310 in FIG. 3) that may be configured to receive electric power from the charging connector 120, thus enabling vehicle 105 charging. In some aspects, the vehicle connector may be a bidirectional connector and may be configured to transmit power from the vehicle 105 to the off-board system. In a similar manner, the charging connector 120 may be a bidirectional connector that may receive power from the vehicle 105.

In some aspects, the charging station 110 may be publicly available electrified vehicle charging station that may belong to a third-party. The charging station 110 may be configured to supply alternating current (AC) power or direct current (DC) power to the vehicle 105. The DC power may enable fast charging of vehicle battery. Stated another way, the DC power may provide sufficient charge to the vehicle battery in relatively short time duration (e.g., 50% in 10-15 minutes). In some aspects, the vehicle 105 may include power converters (not shown) such as AC to DC converter, DC to DC converter, etc. A person ordinarily skilled in the art may appreciate that the AC to DC converter may be used to convert AC power from the charging station 110 to DC power that may be supplied to the vehicle battery. Further, the DC-to-DC converter may be used to convert a first DC voltage to a second DC voltage for different vehicle functions.

The environment 100 may further include a vehicle charging connection interface diagnosing system 130 (hereinafter referred as "system 130"). In some aspects, the system 130 may be a part of the vehicle 105. The system 130 may be connected to one or more external devices, e.g., a user device (not shown) associated with the user 125, a server 140, etc., via one or more networks 135. The server 140 may be associated with the third-party that may manage the charging station 110.

The network(s) 135 illustrates an example communication infrastructure in which the connected devices discussed in various embodiments of this disclosure may communicate. The network(s) 135 may be and/or include the Internet, a private network, public network, or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, Ultra-Wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The system 130 may be configured to receive real-time information associated with each vehicle charger pin of the vehicle connector (e.g., when the vehicle 105 may be charged using the charging connector 120) and perform analysis on the received information. In some aspects, the real-time information may include current drawn by each vehicle charger pin. In other aspects, the real-time information may include voltage potential at each vehicle charger pin. The system 130 may be configured to diagnose working condition of the connection interface (including the vehicle connector and the charging connector 120) based on the information analysis. Specifically, the system 130 may determine whether the charging connector 120 may be improperly connected to the vehicle connector or the connection interface may be faulty based on the information analysis. The detailed process of diagnosing connection interface working condition is described in conjunction with FIG. 2.

Responsive to a determination that the charging connector 120 may be improperly connected to the vehicle connector, the system 130 may transmit a notification to the user device associated with the user 125 or a vehicle 105 Human-Machine Interface (HMI, not shown) to re-connect the charging connector 120 properly. On the other hand, responsive to a determination the connection interface may be faulty, the system 130 may perform self-diagnostic test to determine fault location. Specifically, the system 130 may perform the self-diagnostic test to determine whether the charging connector 120 may be faulty or the vehicle connector (e.g., one or more vehicle charger pins) may be faulty. The detailed process of performing the self-diagnostic test is described in conjunction with FIG. 2.

Responsive to performing the self-diagnostic test, the system 130 may perform a one or more predetermined actions. For example, the system 130 may transmit a notification to the user device associated with the user 125 or the vehicle HMI to repair the vehicle connector when the system 130 determines that the vehicle connector may be faulty. On the other hand, the system 130 may transmit a notification to the server 140 when the system determines that the charging connector 120 may be faulty.

Figure 2:
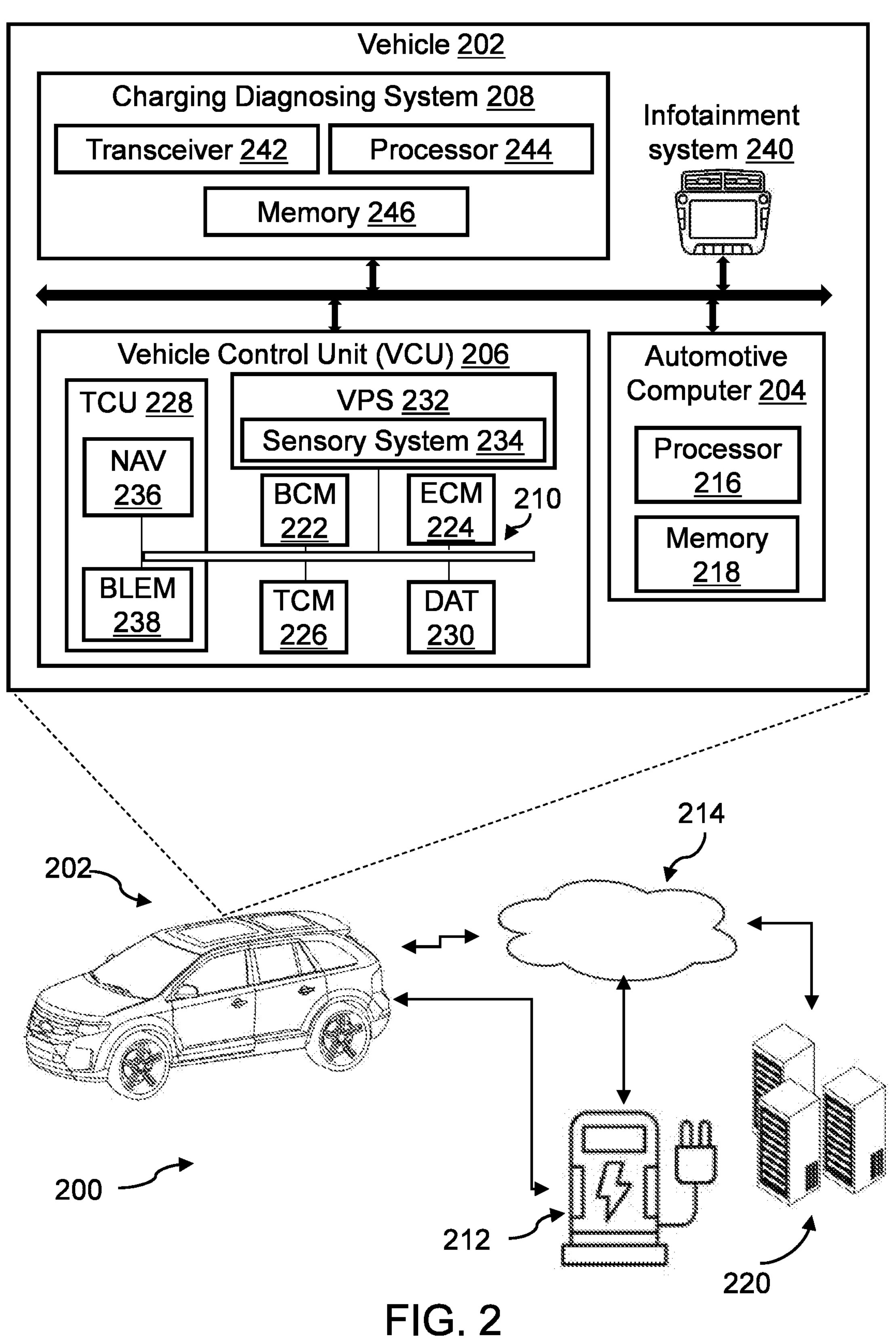
FIG. 2 depicts a block diagram of an example system for diagnosing a vehicle charging connection interface in accordance with the present disclosure.
Figure 3:
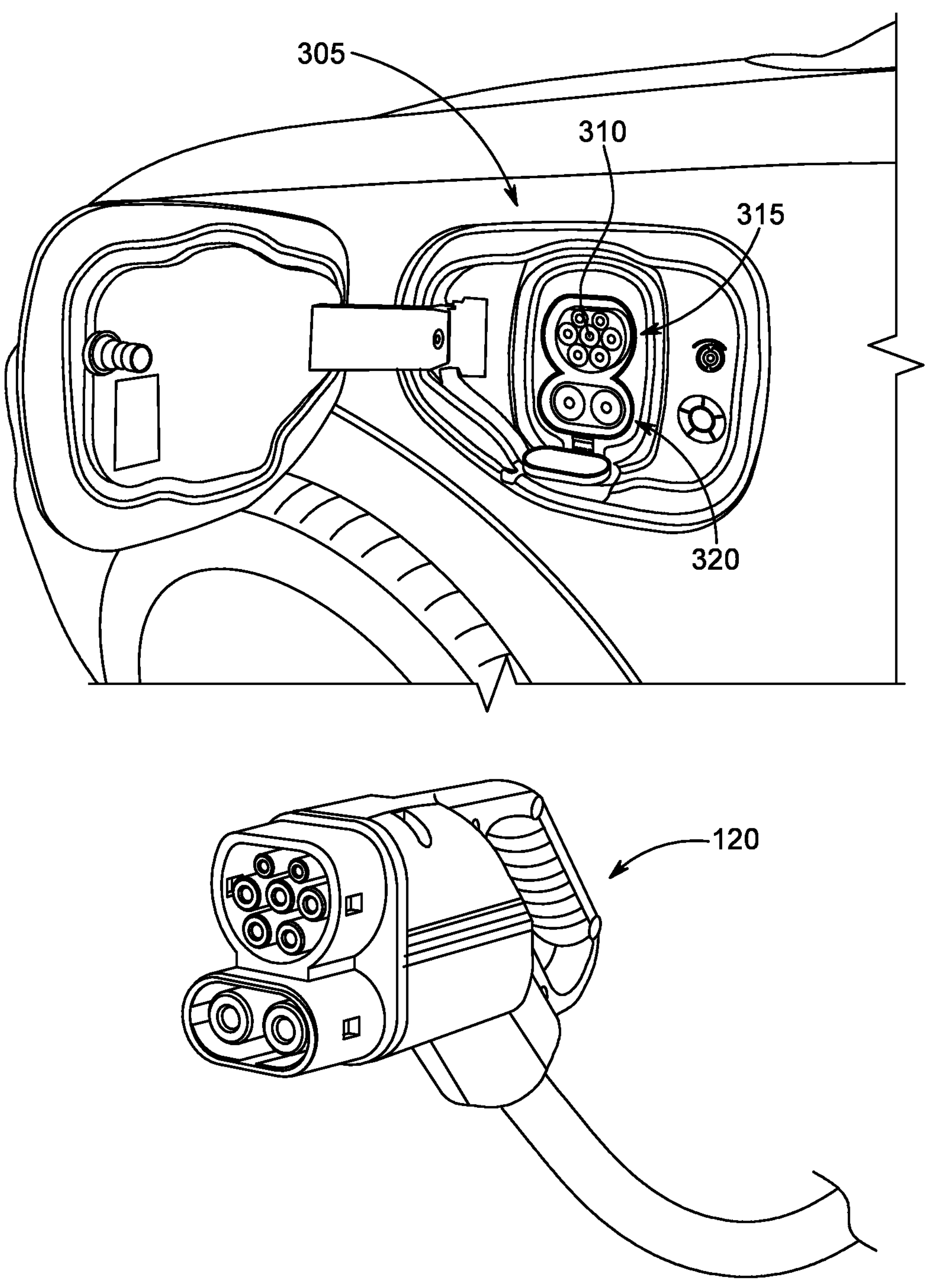
FIG. 3 depicts example snapshots of a vehicle connector and a charger connector in accordance with the present disclosure.

FIG. 2 depicts a block diagram of an example system 200 for diagnosing vehicle charging connection interface in accordance with the present disclosure. While discussing FIG. 2, references may be made to FIG. 3. Specifically, FIG. 3 depicts example snapshots of a vehicle connector (e.g., a vehicle connector 305) and the charging connector 120 in accordance with the present disclosure.

The system 200 may include a vehicle 202, which may be same as the vehicle 105. The vehicle 202 may be configured as an electric vehicle (EV). More particularly, the vehicle 202 may include a battery EV (BEV) drive system or be configured as a hybrid EV (HEV) having an independent onboard powerplant, a plug-in HEV (PHEV) that includes an HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure.

The vehicle 202 may include an automotive computer 204, a Vehicle Control Unit (VCU) 206, and a charging diagnosing system 208 (same as the vehicle charging connection interface diagnosing system 130 described in conjunction with FIG. 1). The VCU 206 may include a plurality of Electronic Control Units (ECUs) 210 disposed in communication with the automotive computer 204.

The system 200 may further include a charging station 212 (same as the charging station 110 described in conjunction with FIG. 1) that may be configured to charge the vehicle 202. The charging station 212 may include the charging connector 120 that may be attached to the vehicle connector 305 to charge the vehicle 202. As shown in FIG. 3, the vehicle connector 305 may include a plurality of vehicle charger pins 310 that may receive electric power from the charging connector 120 and charge the vehicle 202.

In an exemplary aspect, the vehicle connector 305 may include an AC connection 315 and a DC connection 320. The AC connection 315 may be configured to receive AC supply from the charging station 212, and the DC connection 320 may be configured to receive DC supply from the charging station 212. In other aspects, the vehicle connector 305 may include only the AC connection 315 or only the DC connection 320. Further, the plurality of vehicle charger pins 310 may include line pins, ground pins, communication pins, and/or the like. The vehicle connector 305 may include any count of pins, for example, five, six, seven, eight, nine pins, and/or the like. The plurality of vehicle charger pins 310 may be connected to corresponding slots in the charging connector 120 to receive power from the charging station 212.

The charging station 212 may connect with the automotive computer 204 and/or the charging diagnosing system 208 by using wired and/or wireless communication protocols and transceivers. In some aspects, the charging station 212 may be associated with a third party. In further aspects, the system 200 may include a mobile device (not shown) associated with the user 125. In some aspects, the charging station 212 and the mobile device may communicatively couple with the vehicle 202 via one or more network(s) 214, which may communicate via one or more wireless connection(s), and/or may connect with the vehicle 202 directly by using near field communication (NFC) protocols, Bluetooth® protocols, Wi-Fi, Ultra-Wideband (UWB), and other possible data connection and sharing techniques. The network 214 may be same as the network 135.

The system may additionally include one or more server(s) 220 that may be disposed in communication with the automotive computer 204 and/or the charging diagnosing system 208 via the network 214. In some aspects, the server(s) 220 may be part of a cloud-based computing infrastructure and may be associated with and/or include a Telematics Service Delivery Network (SDN) that provides digital data services to the vehicle 202 and other vehicles (not shown in FIG. 2) that may be part of a vehicle fleet. In other aspects, the server(s) 220 may be associated with the third party managing the charging station 212. The server(s) 220 may be configured to store information associated with the charging station 212 (and other charging stations). For example, the server(s) 220 may store information associated with charging station location, tier, availability, specification (including charging capacity, arbitrated charging potential and rate, etc.), maintenance or fault (including historical fault and/or maintenance information), repair status, and/or the like.

In some aspects, the automotive computer 204 and/or the charging diagnosing system 208 may be installed in a vehicle engine compartment (or elsewhere in the vehicle 202). Further, the automotive computer 204 may operate as a functional part of the charging diagnosing system 208. The automotive computer 204 may be or include an electronic vehicle controller, having one or more processor(s) 216 and a memory 218. Moreover, the charging diagnosing system 208 may be separate from the automotive computer 204 (as shown in FIG. 2) or may be integrated as part of the automotive computer 204.

The processor(s) 216 may be disposed in communication with one or more memory devices disposed in communication with the respective computing systems (e.g., the memory 218 and/or one or more external databases not shown in FIG. 2). The processor(s) 216 may utilize the memory 218 to store programs in code and/or to store data for performing aspects in accordance with the disclosure. The memory 218 may be a non-transitory computer-readable memory storing a vehicle charging diagnosis program code. The memory 218 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 206 may share a power bus with the automotive computer 204, and may be configured and/or programmed to coordinate the data between vehicle 202 systems, connected servers (e.g., the server(s) 220), and other vehicles (not shown in FIG. 2) operating as part of a vehicle fleet. The VCU 206 can include or communicate with any combination of the ECUs 210, such as, for example, a Body Control Module (BCM) 222, an Engine Control Module (ECM) 224, a Transmission Control Module (TCM) 226, a telematics control unit (TCU) 228, a Driver Assistances Technologies (DAT) controller 230, etc. The VCU 206 may further include and/or communicate with a Vehicle Perception System (VPS) 232, having connectivity with and/or control of one or more vehicle sensory system(s) 234. The vehicle sensory system 234 may include one or more vehicle sensors including, but not limited to, a Radio Detection and Ranging (RADAR or "radar") sensors, sitting area buckle sensors, sitting area sensors, a Light Detecting and Ranging (LiDAR or "lidar") sensor, door sensors, proximity sensors, temperature sensors, wheel sensors, weight sensors, ambient weather sensors, charging pin current measurement sensors, charging pin voltage measurement sensors, etc. The charging pin current measurement sensors may be configured to measure current drawn by each vehicle charger pin 310, for example, when the vehicle 202 may be charged using the charging station 212. The charging pin voltage measurement sensors may be configured to measure voltage/potential at each vehicle charger pin 310.

In some aspects, the VCU 206 may control vehicle 202 operational aspects and implement one or more instruction sets received from the mobile device, from one or more instruction sets stored in the memory 218, including instructions operational as part of the charging diagnosing system 208. For example, the VCU 206 may transmit a voltage/potential to one or more vehicle charger pins 310 to measure voltage level at the one or more vehicle charger pins 310, responsive to receiving instructions from the charging diagnosing system 208 as described later in the description below.

The TCU 228 can be configured and/or programmed to provide vehicle connectivity to wireless computing systems onboard and off board the vehicle 202, and may include a Navigation (NAV) receiver 236 for receiving and processing a GPS signal, a BLE® Module (BLEM) 238, a Wi-Fi transceiver, a UWB transceiver, and/or other wireless transceivers (not shown in FIG. 2) that may be configurable for wireless communication between the vehicle 202 and other systems (e.g., a vehicle key fob, not shown in FIG. 2), computers, and modules. The TCU 228 may be disposed in communication with the ECUs 210 by way of a bus.

The ECUs 210 may control aspects of vehicle operation and communication using inputs from human drivers, inputs from an autonomous vehicle controller, the charging diagnosing system 208, and/or via wireless signal inputs received via the wireless connection(s) from other connected devices, such as the mobile device (or user device) associated with the user 125, the server(s) 220, among others.

The BCM 222 generally includes integration of sensors, vehicle performance indicators, and variable reactors associated with vehicle systems, and may include processor-based power distribution circuitry that can control functions associated with the vehicle body such as lights, windows, security, camera(s), audio system(s), speakers, door locks and access control, and various comfort controls. The BCM 222 may also operate as a gateway for bus and network interfaces to interact with remote ECUs (not shown in FIG. 2).

The DAT controller 230 may provide Level-1 through Level-3 automated driving and driver assistance functionality that can include, for example, active parking assistance, vehicle backup assistance, adaptive cruise control, and/or lane keeping, among other features. The DAT controller 230 may also provide aspects of user and environmental inputs usable for user authentication.

In some aspects, the automotive computer 204 may connect with an infotainment system 240 that may include a touchscreen interface portion, and may include voice recognition features, biometric identification capabilities that can identify users based on facial recognition, voice recognition, fingerprint identification, or other biological identification means. In other aspects, the infotainment system 240 may be further configured to receive user instructions via the touchscreen interface portion, and/or display notifications, navigation maps, etc. on the touchscreen interface portion. For example, the infotainment system 240 may be configured to display notifications received from the charging diagnosing system 208.

The computing system architecture of the automotive computer 204, the VCU 206, and/or the charging diagnosing system 208 may omit certain computing modules. It should be readily understood that the system depicted in FIG. 2 is an example of a possible implementation according to the present disclosure, and thus, it should not be considered limiting or exclusive.

In accordance with some aspects, the charging diagnosing system 208 may be integrated with and/or executed as part of the ECUs 210. The charging diagnosing system 208, regardless of whether it is integrated with the automotive computer 204 or the ECUs 210, or whether it operates as an independent computing system in the vehicle 202, may include a transceiver 242, a processor 244, and a computer-readable memory 246.

The transceiver 242 may be configured to receive information/inputs from one or more external devices or systems, e.g., the mobile device associated with the user 125, the server(s) 220, and/or the like via the network 214. Further, the transceiver 242 may transmit notifications (e.g., alert/alarm signals) to the external devices or systems, e.g., the server(s) 220, the mobile device. In addition, the transceiver 242 may be configured to receive information/inputs from vehicle 202 components such as the infotainment system 240, the vehicle sensory system 234, and/or the like. Further, the transceiver 242 may transmit notifications (e.g., alert/alarm signals) to the vehicle 202 components such as the infotainment system 240.

The processor 244 and the memory 246 may be same as or similar to the processor 216 and the memory 218, respectively. Specifically, the processor 244 may utilize the memory 246 to store programs in code and/or to store data for performing aspects in accordance with the disclosure. The memory 246 may be a non-transitory computer-readable memory storing the vehicle charging diagnosis program code. In some aspects, the memory 246 may additionally store information associated with the vehicle 202 (including historical fault information associated with the vehicle connector 305), one or more sensory inputs received from the vehicle sensory system 234 (e.g., inputs received from the charging pin current measurement sensors, charging pin voltage measurement sensors, etc.), and information associated with the charging station 212.

In operation, the transceiver 242 may receive real time information associated with each vehicle charger pin 310 from the vehicle sensory system 234. For example, the transceiver 242 may receive current drawn by each vehicle charger pin 310 from the charging connector 120, for example, when the vehicle 202 may be charged using the charging station 212 (via the charging connector 120). In some aspects, the transceiver 242 may receive the information associated with the current drawn by each vehicle charger pin 310 from the charging pin current measurement sensors. In further aspects, the transceiver 242 may receive a voltage level for each vehicle charger pin 310, when the vehicle 202 may be charged using the charging station 212 or when the vehicle 202 performs self-diagnostic test on the vehicle connector 305. The self-diagnostic test is described later in the description below.

The processor 244 may be configured to obtain the real time information from the transceiver 242. In some aspects, the processor 244 may obtain the real time information when the vehicle connector 305 may be connected to the charging connector 120. For example, the processor 244 may obtain the current drawn by each vehicle charger pin 310 when the vehicle 202 may be charged using the charging connector 120.

The processor 244 may determine whether the charging connector 120 may be improperly connected to the vehicle connector 305 or the connection interface (including the charging connector 120 and the vehicle connector 305) may be faulty, based on the obtained real time information associated with each vehicle charger pin 310. Specifically, the processor 244 may compare the current drawn by each vehicle charger pin 310 from the charging connector 120 with a threshold (e.g., a first threshold), which may be pre-stored in the memory 246. The threshold may be an "expected" current that may be drawn by each vehicle charger pin 310 from the charging connector 120, based on the charging potential associated with the charging station 212. In some aspects, the charging potential associated with the charging station 212 may be part of charging station 212 specification that may be provided by the server(s) 220 to the processor 244 (via the transceiver 242). In this case, the processor 244 may determine the expected current (i.e., the threshold) when the processor 244 obtains the charging station 212 specification from the server(s) 220, and may store the determined threshold in the memory 246.

The processor 244 may determine whether the current drawn by one or more vehicle charger pins 310 or all vehicle charger pins 310 is less than the threshold, based on the comparison. Stated another way, the processor 244 may determine if there is a difference between current drawn from one charger pin to another. Responsive to a determination that the current drawn by all the vehicle charger pins 310 is less than the threshold, the processor 244 may determine that the charging connector 120 may be improperly connected to the vehicle connector 305. Stated another way, the processor 244 may determine that since all the vehicle charger pins 310 are drawing less current than expected (thus, there is general lack of current into all the vehicle charger pins 310), there is a high likelihood or probability that the charging connector 120 may be improperly connected to the vehicle connector 305. In further aspects, the processor 244 may determine that the charging connector 120 may be improperly connected even when not all vehicle charger pins 310 may be drawing less current than expected. Specifically, in this case, the processor 244 may determine location of charger pins drawing less current than expected, and determine that the charging connector 120 may be improperly connected based on location of such charger pins. For example, when the processor 244 determines that left charger pins may be drawing expected current but the right charger pins (e.g., adjacent right charge pins) may be drawing less current than expected, the processor 244 may determine that there may be a high likelihood that the charging connector 120 may be improperly connected. Stated another way, the processor 244 may determine that the charging connector 120 may be improperly connected when two adjacent charger pins may be drawing less current than expected. In such cases, the processor 244 may transmit, via the transceiver 242, a notification to the mobile device associated with the user 125 and/or the infotainment system 240, requesting the user 125 to re-connect the charging connector 120 properly. The user 125 may then re-connect the charging connector 120 and the vehicle connector 305.

On the other hand, responsive to a determination that the current drawn by one or more vehicle charger pins 310 (and not all the vehicle charger pins 310) is less than the threshold, the processor 244 may determine that the connection interface may be faulty. Stated another way, the processor 244 may determine that the connection interface may be faulty when the current drawn by a first vehicle charger pin may be less than the threshold, and current drawn by another vehicle charger pin (e.g., a second vehicle charger pin) may be equivalent to the threshold. For example, the processor 244 may determine that the connection interface may be faulty when the processor 244 determines that two pins may be drawing current less than the threshold and three pins may be drawing current equivalent to the threshold. In further aspects (as described above), the processor 244 may determine the location of charger pins that may be drawing less-than-expected current, and the processor 244 may determine that the connection interface may be faulty based on the location of such charger pins. For example, when the processor 244 determines that two charger pins that are located on opposite sides (e.g., two distant charging pins) may be drawing less current than expected, the processor 244 may determine that there is a high likelihood that the connection interface may be faulty. On the other hand, when the processor 244 determines that two charger pins that are adjacent to each other may be drawing less current than expected, the processor 244 may determine that the charging connector 120 may be improperly connected.

Responsive to determining that the connection interface may be faulty, the processor 244 may perform the self-diagnostic test to determine the specific connection interface component that may be faulty. Specifically, the processor 244 may determine whether the vehicle connector 305 may be faulty or the charging connector 120 may be faulty.

To perform the self-diagnostic test, since the vehicle connector 305 may be bidirectional, the processor 244 may transmit, via the VCU 206, a voltage signal (e.g., a first potential) to each vehicle charger pin 310, for example, when the vehicle connector 305 may be connected to the charging station 110 (or any other off-board system). The processor 244 may transmit the same potential, e.g., the first potential, to each vehicle charger pin 310. The processor 244 may transmit the first potential to all vehicle charger pins 310 simultaneously or may transmit the first potential to each vehicle charger pin 310 sequentially (i.e., one-by-one).

The charging station 110 (or the off-board system) may then measure potential output (e.g., second potential) at each vehicle charger pin 310 and may report the second potential to the processor 244. Responsive to obtaining the second potential from the charging station 110 (or the off-board system), the processor 244 may compare the first potential and the second potential for each vehicle charger pin 310, and determine a difference between the first potential and the second potential. The processor 244 may then compare the determined difference for each vehicle charger pin 310 with a second threshold (that may be pre-stored in the memory 246). The processor 244 may determine that one or more vehicle charger pins 310 may be faulty when the determined difference for the one or more vehicle charger pins may be greater than the second threshold.

Responsive to the determination that the one or more vehicle charger pins 310 may be faulty, the processor 244 may be configured to transmit, via the transceiver 242, a notification to the mobile device associated with the user 125 and/or the infotainment system 240, requesting the user 125 to repair the vehicle connector 305. Stated another way, the processor 244 may transmit a notification associated with vehicle maintenance to the user 125 when the processor 244 determines that one or more vehicle charger pin(s) 310 (or the vehicle connector 305) may be faulty. In some aspects, the notification may include locations or identifiers of faulty vehicle charger pins 310, so that the user 125 may accordingly get the vehicle connector 305 repaired.

In some aspects, the processor 244 may be configured to determine a reason for the fault based on the measured second potential at each vehicle charger pin 310. For example, the processor 244 may be configured to determine that the vehicle charger pin 310 may be faulty due to moisture or heat based on location of faulty pins and pins that may not be faulty in the vehicle connector 305. The processor 244 may be configured to store the information associated with vehicle connector 305 fault in the memory 246 as "historical fault information" associated with the vehicle connector 305.

On the other hand, the processor 244 may determine that the charging connector 120 may be faulty when the difference between the first potential and the second potential may be less than the second threshold. Stated another way, the processor 244 may determine that all the vehicle charger pins 310 (and hence the vehicle connector 305) may be working properly and the charging connector 120 may be faulty when the difference between the first potential and the second potential may be less than the second threshold.

Responsive to determining that the charging connector 120 may be faulty, the processor 244 may transmit, via the transceiver 242, a notification to the server 220 to repair the charging connector 120. In some aspects, the processor 244 may additionally transmit a notification associated with charging station 212 maintenance to the mobile device associated with the user 125 and/or the infotainment system 240, when the processor 244 determines that the charging connector 120 may be faulty.

In further aspects, the processor 244 may be configured to "verify" whether the vehicle connector 305 may be faulty or the charging connector 120 may be faulty based on historical information associated with the vehicle connector 305 and the charging connector 120. Specifically, the processor 244 may obtain historical fault information associated with the charging connector 120 from the server 220, and historical fault information associated with the vehicle connector 305 from the memory 246. Responsive to obtaining the historical information (for both the vehicle connector 305 and the charging connector 120), the processor 244 may be configured to verify whether the vehicle connector 305 may be faulty or the charging connector 120 may be faulty.

For example, when the processor 244 determines that all the vehicle charger pins 310 may be working properly in the self-diagnostic test, the processor 244 may obtain and analyze historical fault information associated with the charging connector 120 and determine whether other vehicles (e.g., vehicles that may have used the charging connector 120 historically for charging) have reported charging connector 120 fault to the server(s) 220. The processor 244 may verify/confirm that the fault may be with the charging connector 120 (or the charging station 212) when the processor 244 determines that other vehicles too have historically reported fault with the charging connector 120 to the server(s) 220.

Similarly, when the processor 244 determines that one or more vehicle charger pins 310 may be faulty in the self-diagnostic test, the processor 244 may obtain and analyze historical fault information associated with the vehicle connector 305 (e.g., whether the vehicle connector 305 was working fine with other charging stations or the charging station 212 in the past). Based on the analysis, the processor 244 may be configured to verify/confirm that the vehicle connector 305 may be faulty. Responsive to the verification, the processor 244 may transmit the notification described above to the mobile device associated with user 125, the infotainment system 240, and/or the server(s) 220.

Figure 4:
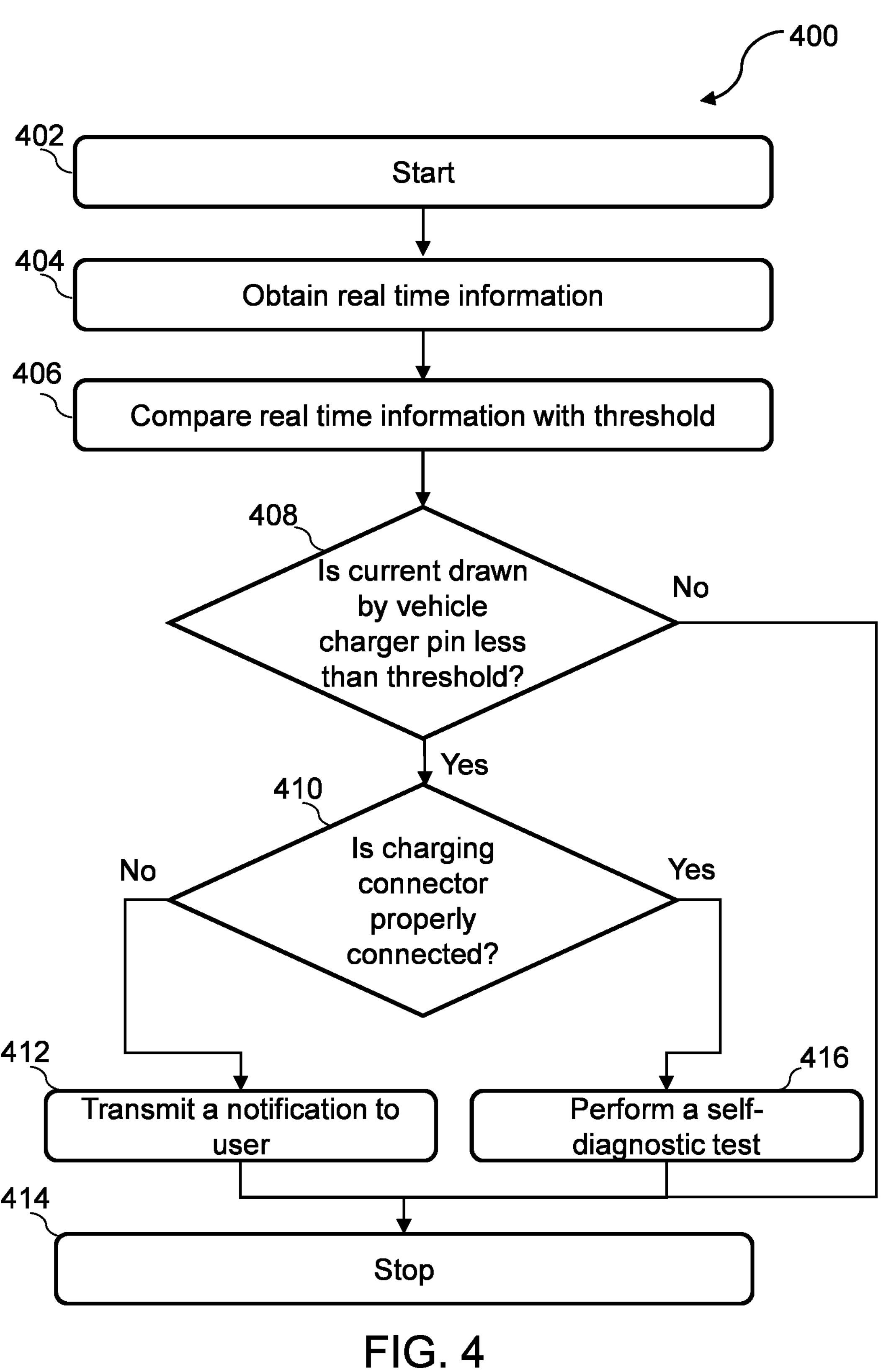
FIG. 4 depicts a flow diagram of an example first method for diagnosing a vehicle charging connection interface, in accordance with the present disclosure.

FIG. 4 depicts a flow diagram of an example first method 400 for diagnosing vehicle charging connection interface, in accordance with the present disclosure. FIG. 4 may be described with continued reference to prior figures, including FIGS. 1-3. The following process is exemplary and not confined to the steps described hereafter. Moreover, alternative embodiments may include more or less steps that are shown or described herein and may include these steps in a different order than the order described in the following example embodiments.

Referring to FIG. 4, at step 402, the method 400 may commence. At step 404, the method 400 may include obtaining, by the processor 244, real time information associated with the vehicle charging pins 310 from the vehicle sensory system 234. In some aspects, the real time information may include information associated with current drawn by each vehicle charger pin 310 when the vehicle 202 may be charged using the charging station 212 (e.g., via the charging connector 120).

At step 406, the method 400 may include comparing, by the processor 244, the real time information with a threshold (e.g., a first threshold). For example, the processor 244 may compare the current drawn by each vehicle charger pin 310 with the first threshold that may be stored in the memory 246.

At step 408, the method 400 may include determining, by the processor 244, whether the current drawn by one or more vehicle charge pins 310 is less than the first threshold. Responsive to a determination that the current drawn by all the vehicle charge pins 310 may be greater than the first threshold, the method 400 moves to step 414 at which the method 400 stops. On the other hand, responsive to a determination that the current drawn by one or more vehicle charge pins 310 may be less than the first threshold, the method 400 moves to step 410.

At step 410, the method 400 may include determining, by the processor 244, whether the charging connector 120 is properly connected to the vehicle connector 305. For example, the processor 244 may analyze current drawn by each vehicle charger pin 310, and may determine that the vehicle connector 305 may be improperly connected when the current drawn by all vehicle charger pins 310 may be less than the first threshold or when the current drawn by adjacent vehicle charger pins may be less than the first threshold. Responsive to a determination that the charging connector 120 may be improperly connected, the method 400 moves to step 412. At step 412, the method 400 may include transmitting, by the processor 244, a notification to the mobile device associated with the user 125 (and/or the infotainment system 240) requesting the user 125 to correctly connect the charging connector 120 to the vehicle connector 305. The user 125 may receive the notification and may re-connect the charging connector 120.

On the other hand, when the processor 244 determines that the current drawn by a vehicle charger pin (e.g., a first vehicle charging pin) is less than the first threshold, and the current drawn by another vehicle charger pin (e.g., a second vehicle charging pin) is equivalent to the first threshold or when current drawn by distant vehicle charger pins (e.g., non-adjacent) is less than the first threshold, the processor 244 may determine that the charging connector 120 may be properly connected and the connection interface (including the vehicle connector 305 and the charging connector 120) may be faulty. Responsive to a determination that the charging connector 120 may be properly connected (and the connection interface may be faulty), the method moves to step 416. At step 416, the method 400 may include performing, by the processor 244, a self-diagnostic test. The method 500 may then move to step 414. The details of the self-diagnostic test are described in conjunction with FIGS. 2 and 5.

At step 414, the method 400 may stop.

Figure 5:
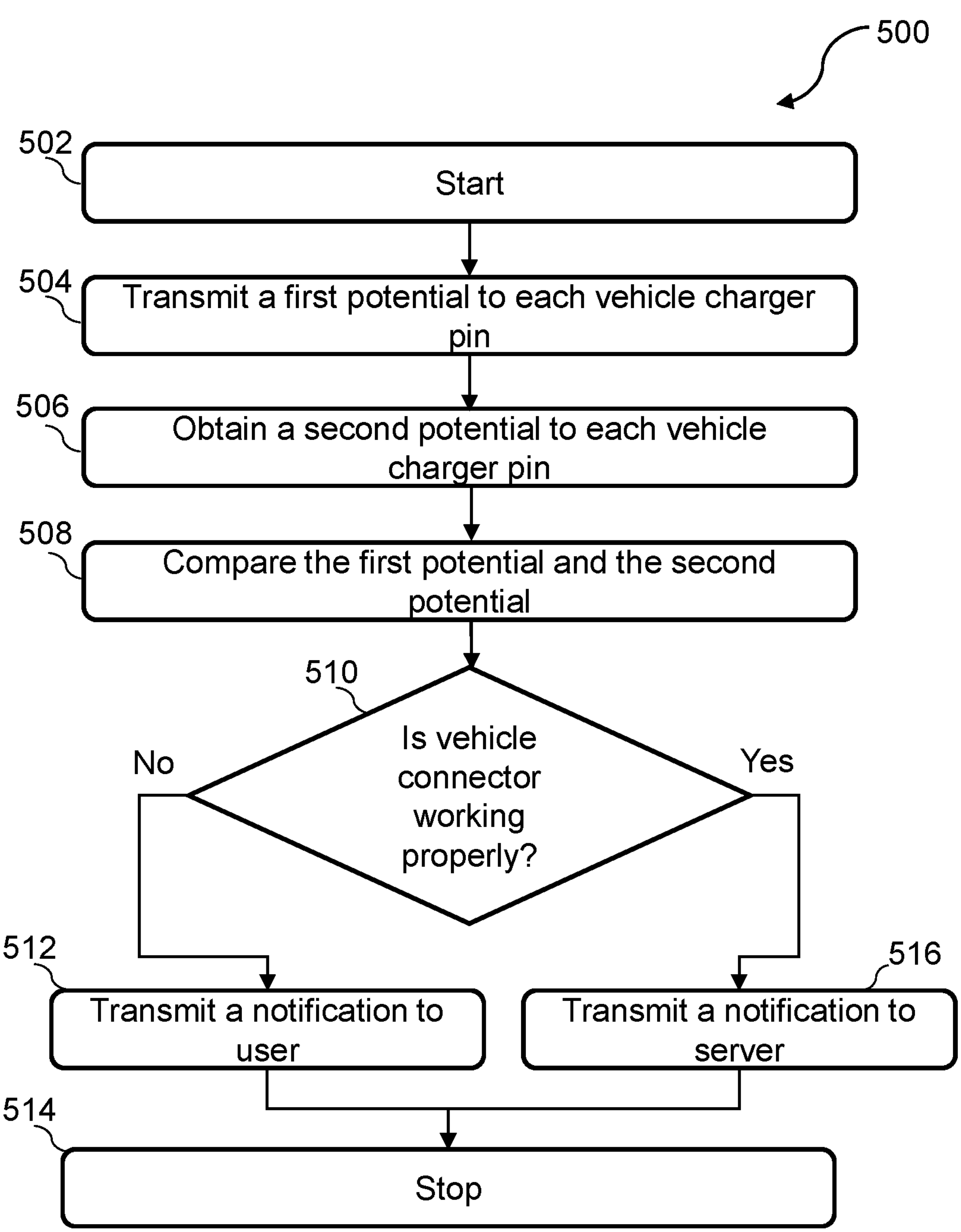
FIG. 5 depicts a flow diagram of an example second method for performing self-diagnostic test, in accordance with the present disclosure.

FIG. 5 depicts a flow diagram of an example second method 500 for performing self-diagnostic test, in accordance with the present disclosure. FIG. 5 may be described with continued reference to prior figures, including FIGS. 1-4. The following process is exemplary and not confined to the steps described hereafter. Moreover, alternative embodiments may include more or less steps that are shown or described herein and may include these steps in a different order than the order described in the following example embodiments.

At step 502, the method 500 may commence. At step 504, the method 500 may include transmitting, by the processor 244, a voltage signal (e.g., a first potential) to each vehicle charger pin 310. In some aspects, the processor 244 may transmit the first potential via the VCU 206 to all the vehicle charger pins 310 simultaneously or to each vehicle charger pin 310 sequentially (e.g., one-by-one).

At step 506, the method 500 may include obtaining, by the processor 244, a second potential output at each vehicle charger pin 310 responsive to transmitting the first potential. In some aspects, the charging station 110 (or other off-board systems) may measure the second potential at each vehicle charger pin 310, and the processor 244 may obtain the measured second potential from the charging station 110 (or other off-board systems). At step 508, the method 500 may include comparing, by the processor 244, the first potential with the second potential.

At step 510, the method 500 may include determining, by the processor 244, that the vehicle connector 305 may be working properly based on the comparison. For example, when the processor 244 determines that a difference between the first potential and the second potential may be greater than a second threshold, the processor 244 may determine that the vehicle connector 305 (e.g., one or more vehicle charger pins 310) may be faulty. Responsive to a determination that the vehicle connector 305 may not be working properly, the processor 244 may transmit a notification to the user 125 to repair the vehicle 202 (or get a service for the vehicle 202), at step 512. The method 500 may then move to step 514.

On the other hand, when the processor 244 determines that the vehicle connector 305 may be working properly (and the difference between the first potential and the second potential may be less than the second threshold), the processor 244 may determine that the charging connector 120 may be faulty. Responsive to a determination that the charging connector 120 may be faulty, the processor 244 may transmit a notification to the server 220 to report faulty charging station 212, at step 516. The method 500 may then move to step 514.

At step 514, the method 500 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:

a plurality of vehicle charger pins configured to be connected with a charging connector of an off-board system, wherein the off-board system is a charging station or another vehicle;

a transceiver configured to receive real-time information associated with each vehicle charger pin when the vehicle is charged using the charging connector;

a processor communicatively coupled with the transceiver, wherein the processor is configured to:

obtain the real-time information from the transceiver;

determine whether the charging connector is improperly connected or a connection interface is faulty based on the real-time information;

perform a self-diagnostic test to determine whether a vehicle charger pin is faulty or the charging connector is faulty responsive to a determination that the connection interface is faulty;

perform a first predetermined action based on the self-diagnostic test, wherein the real-time information comprises current drawn by each vehicle charger pin;

compare the current drawn by each vehicle charger pin with a first threshold; and determine, based on comparing the current drawn by each vehicle charger pin with the first threshold, whether the charging connector is improperly connected or the connection interface is faulty.

2. The vehicle of claim 1, wherein the processor is further configured to perform a second predetermined action based on a determination that the charging connector is improperly connected.

3. The vehicle of claim 2, wherein the processor is configured to perform the second predetermined action by transmitting a first notification to a user interface to reconnect the charging connector.

4. The vehicle of claim 1, wherein the processor is configured to:

determine that the charging connector is improperly connected when the current drawn by each vehicle charger pin is less than the first threshold or when two adjacent charger pins are drawing current less than the first threshold; and determine that the connection interface is faulty when the current drawn by a first vehicle charger pin is less than the first threshold and the current drawn by a second vehicle charger pin is equivalent to the first threshold or when two distant charger pins are drawing current less than the first threshold.

5. The vehicle of claim 1, wherein the plurality of vehicle charger pins is a part of vehicle connector, wherein the vehicle connector is a bidirectional connector configured to transmit power to the off-board system, and wherein the processor is configured to perform the self-diagnostic test by:

transmitting a first potential to the vehicle charger pin;

obtaining a second potential at the vehicle charger pin responsive to transmitting the first potential;

comparing the first potential and the second potential;

determining that the vehicle charger pin is faulty when a difference between the first potential and the second potential is greater than a second threshold; and determining that the charging connector is faulty when the difference between the first potential and the second potential is less than the second threshold.

6. The vehicle of claim 5, wherein the processor performs the first predetermined action by transmitting a second notification to a user interface based on a determination that the vehicle charger pin is faulty, and wherein the second notification is associated with vehicle maintenance.

7. The vehicle of claim 5, wherein the processor performs the first predetermined action by transmitting a third notification to a server based on a determination that the charging connector is faulty, and wherein the third notification is associated with charging connector maintenance.

8. The vehicle of claim 1, wherein the transceiver is further configured to receive historical information associated with the charging connector and the plurality of vehicle charger pins, and wherein the processor is configured to determine whether the vehicle charger pin or the charging connector is faulty based on the historical information.

9. A vehicle comprising:

a plurality of vehicle charger pins configured to be connected with a charging connector of an off-board system, wherein the off-board system is a charging station or another vehicle;

a transceiver configured to receive real-time information associated with each vehicle charger pin when the vehicle is charged using the charging connector;

a processor communicatively coupled with the transceiver, wherein the processor is configured to:

obtain the real-time information from the transceiver;

determine whether the charging connector is improperly connected or a connection interface is faulty based on the real-time information;

perform a self-diagnostic test to determine whether a vehicle charger pin is faulty or the charging connector is faulty responsive to a determination that the connection interface is faulty; and perform a first predetermined action based on the self-diagnostic test, wherein the plurality of vehicle charger pins is a part of vehicle connector, wherein the vehicle connector is a bidirectional connector configured to transmit power to the off-board system, and wherein the processor is configured to perform the self-diagnostic test by:

transmitting a first potential to the vehicle charger pin;

obtaining a second potential at the vehicle charger pin responsive to transmitting the first potential;

comparing the first potential and the second potential;

determining that the vehicle charger pin is faulty when a difference between the first potential and the second potential is greater than a second threshold; and determining that the charging connector is faulty when the difference between the first potential and the second potential is less than the second threshold.

10. The vehicle of claim 9, wherein the processor performs the first predetermined action by transmitting a second notification to a user interface based on a determination that the vehicle charger pin is faulty, and wherein the second notification is associated with vehicle maintenance.

11. The vehicle of claim 9, wherein the processor performs the first predetermined action by transmitting a third notification to a server based on a determination that the charging connector is faulty, and wherein the third notification is associated with charging connector maintenance.

* * * * *